Patented May 2, 1933

1,906,464

UNITED STATES PATENT OFFICE

CYRUS HOWARD HAPGOOD, OF NUTLEY, NEW JERSEY, ASSIGNOR TO THE DE LAVAL SEPARATOR COMPANY, OF NEW YORK, N. Y., A CORPORATION OF NEW JERSEY

BEARINGS FOR ROTARY VACUUM PUMPS

Application filed January 18, 1928. Serial No. 247,588.

The type of vacuum pump to which the present invention is particularly applicable comprises a housing, a hollow rotor within and eccentric to the housing, an air inlet port to, and an air outlet port from, the air space between rotor and housing, slidable vanes carried by the rotor and arranged radially to the rotor shaft and which extend into said air space and contact with the housing during the rotation of the rotor, a driving shaft to which the hollow rotor is secured, and a driving pulley on the shaft. Vacuum pumps of this character are disclosed in the Leitch Patent No. 1,367,554, dated February 8, 1921, the Hall Patent No. 1,374,650, dated April 12, 1921, a patent issued to me, No. 1,637,484, dated August 2, 1927, and an application filed by me November 30, 1926, Serial No. 151,659.

In the operation of such a pump, conditions arise which tend to displace the shaft in the direction of extension of its axis. The main cause of this tendency is the side pull or drag of the driving belt on the driving pulley. This displacement produces excessive wear at one end of the rotor and leakage at the other end.

Conditions also arise which tend to displace the shaft radially. In view of the fact that the cylindrical body of the rotor must be so nearly precisely tangential to the cylindrical inner wall of the housing as to allow free rotation of the rotor and at the same time avoid leakage, between the rotor and housing, from the high pressure side to the low pressure side of the pump, it will be understood that any radial displacement of the rotor shaft must cause the cylindrical outer face of the rotor either to bind against the cylindrical inner wall of the housing or to recede therefrom. The direction in which the unbalanced pressure actually tends to displace the shaft is such as to displace the rotor away from tangential contact with the housing and cause leakage from the high pressure side to the low pressure side of the pump, with resultant serious inefficiency.

Figure 1:
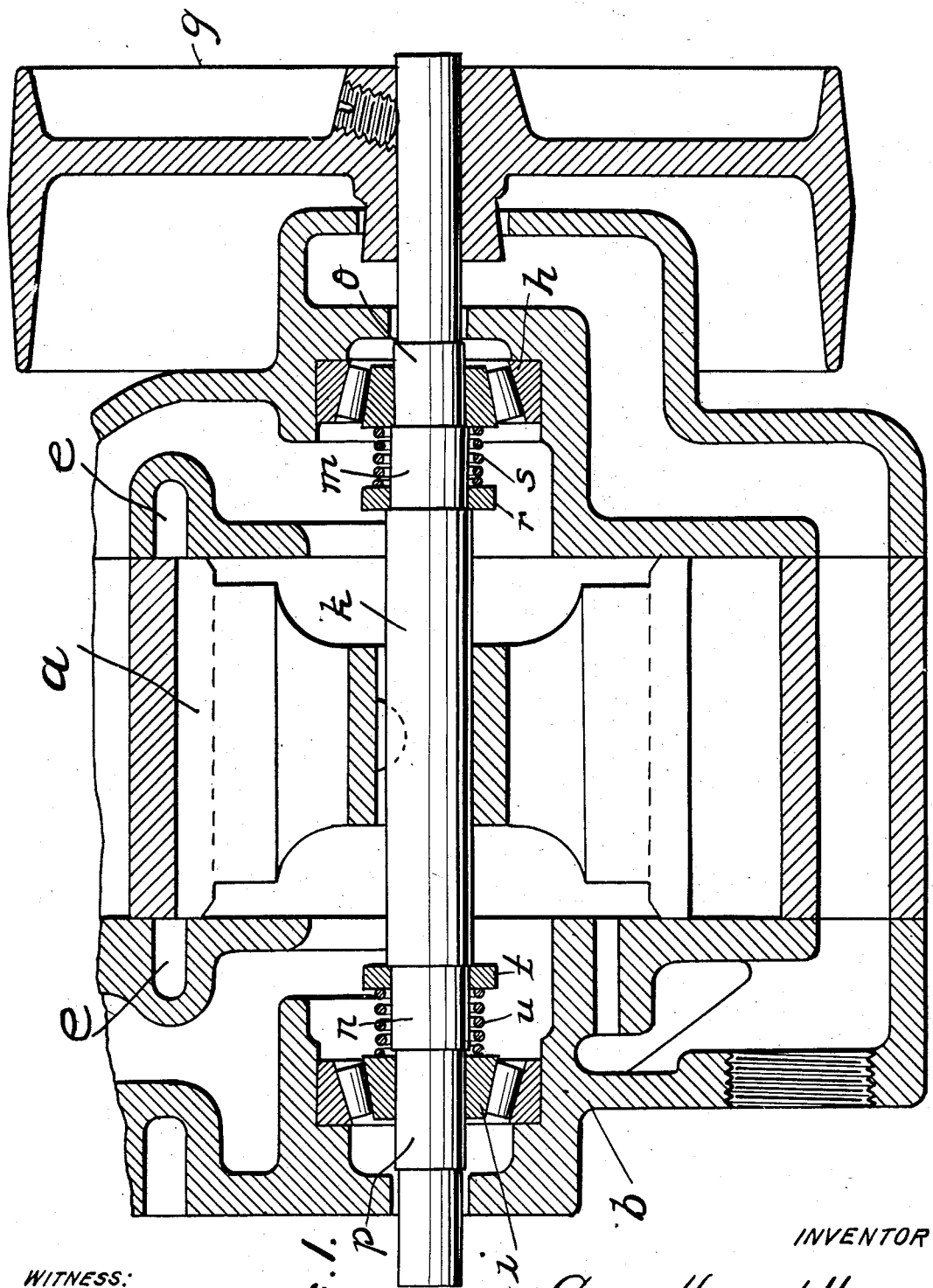
Figure 2:
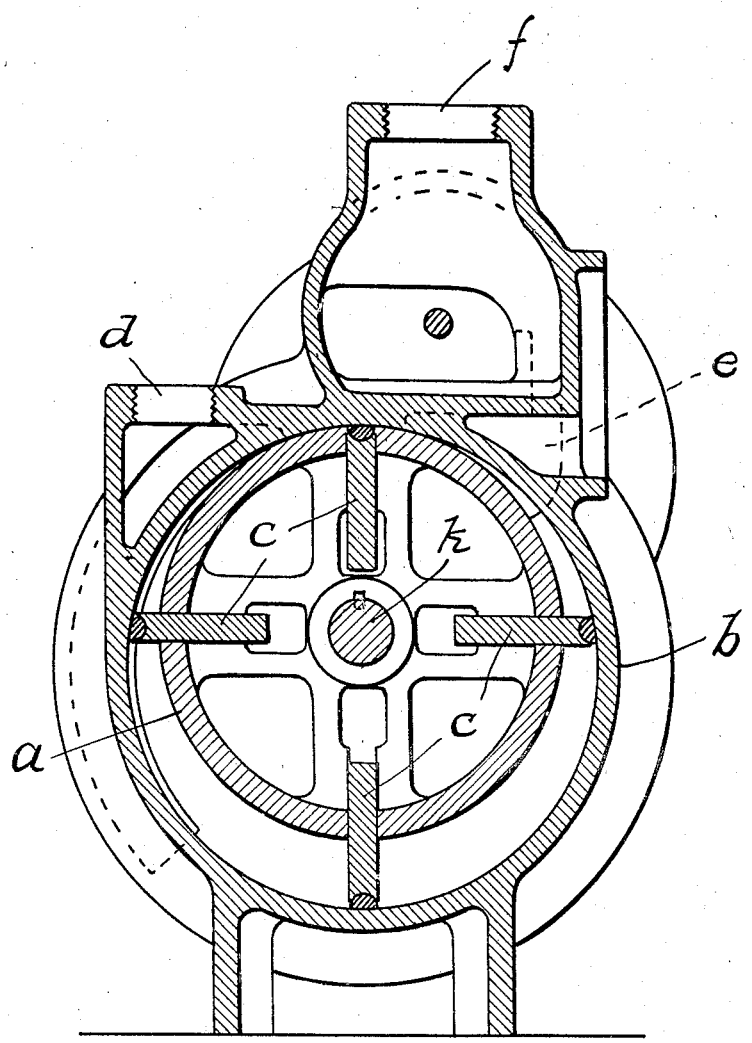

In the construction shown in the accompanying drawings, of which Fig. 1 is a longitudinal section, and Fig. 2 is a transverse section through the pump, and which represents a preferred embodiment of the invention, the difficulties are overcome. The construction includes adequate provisions for allowing a limited movement of the shaft in the direction of its axis and for balancing the opposing forces acting on the shaft, prevents axial displacement of the shaft, permits the use of coil springs (which are much more efficient than leaf springs) between the shaft and the bearings, creates no conditions that would cause the bearings to cramp, and presents no difficult problems in the application of the bearing to the pump casing; while there is no condition which tends to cause pressure of the rotor, in the direction of the axis of the shaft, against one wall of the housing.

Rotor $a$ is splined on, so as to be slidable axially along, a shaft (carried by bearings as hereinafter described) extending through the housing wall $b$. Rotor $a$ has slots through which wings or vanes $c$ extend into contact with the inner wall of the housing, these vanes sliding toward and from the shaft in the rotation of the rotor, which is eccentrically disposed with relation to the housing. $d$ is the air inlet port to the air space between rotor and housing, and $e$ the air outlet port from said space. The outlet port $e$ communicates with a passing leading through an oil separator (not shown in detail) to the discharge $f$ from the housing.

Keyed to the shaft is a driving pulley $g$.

In the housing wall $b$ at each end of the housing is an internal recess in which is fitted a fixed bearing preferably of the conical roller type. The bearing nearer the driving pulley is lettered $h$, the other bearing being lettered $i$. The inner races of these bearings $h$ and $i$ are slidable axially along the portions of the shaft $o$ and $p$ (to be hereinafter described) respectively.

The central portion $k$ of the shaft, which is of relatively large diameter, extends through and beyond opposite sides of the rotor $a$. Between this shaft section $k$ and bearing $h$ is a shaft section $m$ of medium diameter. Between central section $k$ of the shaft and bearing $i$ is another shaft section $n$ of medium diameter. Beyond shaft section $m$, that section $o$ of the shaft which extends through bearing $h$ is of still smaller diameter and beyond that the shaft may be, if desired, still further reduced in diameter. Beyond shaft section $n$, that section $p$ of the shaft which extends through bearing $i$ is also of smaller diameter and beyond that the shaft may be, if desired, still further reduced in diameter.

Sleeved on shaft section $m$ is a collar $r$ and confined between bearing $h$ and collar $r$ is a spring $s$, which holds collar $r$ against the shoulder on one end of central shaft section $k$.

Sleeved on shaft section $n$ is a collar $t$ and confined between bearing $i$ and collar $t$ is a spring $u$, which holds collar $t$ against the shoulder on the other end of central shaft section $k$.

The distance along the shaft from the shoulder at the outer end of shaft section $m$ to the shoulder at the outer end of shaft section $n$ is slightly less than the distance between the inner faces of bearings $h$ and $i$, so as to allow for any variation in the width of the housing. It is desirable, but not necessary, that spring $s$ be slightly weaker than spring $u$ in order that the shoulder of shaft portion $m$ may normally be in contact with the inner race of bearing $h$, thus preventing, under normal operating conditions, a continual movement of the shaft through the bearings.

When the pump is in operation, the springs $s$ and $u$ maintain pressure against the inner raceway of the bearings $h$ and $i$, which prevents any radial displacement of the shaft. When the longitudinal thrust of the shaft is toward the left, Fig. 1, the shaft has a positive end thrust against bearing $i$. When the longitudinal thrust of the shaft is toward the right, Fig. 1, the shaft has a positive end thrust against bearing $h$. Any slight axial movement of the shaft is not transmitted to the rotor, which therefore does not tend to press against one side or the other of the housing; and there being no radial displacement of the shaft, there can be no radial displacement of the rotor.

Having now fully described my invention, what I claim and desire to protect by Letters Patent is:

1. In a vacuum pump comprising a pump housing, a driving shaft extending through the housing, and a rotor in the housing non-rotatably and slidably mounted on the shaft, the combination of shaft bearings at opposite ends of the housing, said shaft having a central section of relatively large diameter extending through the rotor, sections adjacent the end section of medium diameter, and sections extending within the bearings of relatively small diameter, collars on the medium diameter shaft sections, and coil springs surrounding the last named sections, each spring confined between the corresponding bearing and collar and pressing against the bearing and holding the collar against the corresponding end of the large diameter shaft section, the length of the shaft between the outer ends of the medium diameter shaft sections being less than the distance between the bearings.

2. In a vacuum pump comprising a pump housing, a driving shaft extending through the housing, and a rotor in the housing non-rotatably and slidably mounted on the shaft, the combination of shaft bearings at opposite ends of the housing, each bearing comprising an outer raceway in fixed relation to the housing, an inner raceway and conical rollers between the raceways, said shaft having a central section of relatively large diameter extending through the rotor, sections adjacent the end section of medium diameter, and sections extending within the bearings of relatively small diameter, collars on the medium diameter shaft sections, the length of the shaft between the outer ends of the medium diameter shaft sections being less than the distance between the bearings, and coil springs surrounding the last named sections, each spring being confined between the corresponding collar and bearing and holding the collar against the corresponding end of the large diameter shaft section and pressing the inner raceway of the corresponding bearing against the rollers.

In testimony of which invention, I have hereunto set my hand, at city of New York, New York, on this 27th day of December, 1927.

CYRUS HOWARD HAPGOOD.